(12) United States Patent
Chang

(10) Patent No.: US 6,755,431 B2
(45) Date of Patent: Jun. 29, 2004

(54) DERAILLEUR SYSTEM FOR BICYCLE

(76) Inventor: Yu-Ching Chang, No. 20, Alley 32, Lane 190, Shish Rd., Fengyuan City, Taichung Hsien (TW)

( * ) Notice: Subject to any disclaimer, the term of this patent is extended or adjusted under 35 U.S.C. 154(b) by 140 days.

(21) Appl. No.: 10/233,114

(22) Filed: Sep. 3, 2002

(65) Prior Publication Data

US 2004/0043852 A1 Mar. 4, 2004

(51) Int. Cl.[7] .............................................. B62M 1/02
(52) U.S. Cl. ...................................... 280/260; 280/259
(58) Field of Search ........................ 280/259, 260; 74/412 R, 416; 474/78

(56) References Cited

U.S. PATENT DOCUMENTS

| | | | | |
|---|---|---|---|---|
| 649,878 A | * | 5/1900 | Scharbach | 280/260 |
| 707,359 A | * | 8/1902 | Scharbach | 74/347 |
| 714,614 A | * | 11/1902 | Scognamillo et al. | 74/366 |
| 1,059,275 A | * | 4/1913 | Chambers et al. | 74/366 |
| 4,005,611 A | * | 2/1977 | Jeffries | 74/416 |
| 4,447,068 A | * | 5/1984 | Brooks | 280/260 |
| 5,251,504 A | * | 10/1993 | Summerville et al. | 74/368 |
| 5,496,049 A | * | 3/1996 | Escobedo | 280/238 |

* cited by examiner

Primary Examiner—David A. Bucci
Assistant Examiner—Vicky A. Johnson
(74) Attorney, Agent, or Firm—Browdy and Neimark, P.L.L.C.

(57) ABSTRACT

A derailleur system for bicycle is constructed to include an annular plate holding at least two gears, a bracket assembly rotated to a center hole of the annular plate to hold a transmission shaft, a driven gear wheel set pivoted to the transmission shaft and having a driven gear wheel meshed with one of the gears, a control device connected to a derailleur cable of the bicycle, and a driven member for selectively controlling the engagement between the driven gear wheels of the driven gear wheel set with the transmission shaft subject to the position of the control device.

9 Claims, 7 Drawing Sheets

DERAILLEUR SYSTEM FOR BICYCLE

BACKGROUND OF THE INVENTION

1. Field of the Invention

The present invention relates to bicycles and, more particularly, to a derailleur system for bicycle.

2. Description of the Related Art

Regular bicycles commonly use a chain transmission mechanism to transmit rotary driving force from the pedal and crank set to the rear wheel. When riding a bicycle, the drive chain may fall out of the chain wheel. There are bicycles with a front or rear derailleur for transmitting driving force from the chain transmission mechanism to the front or rear wheel of the bicycle. The bicycle rider can shift the gear position of the derailleur only when propelling the bicycle. A derailleur of this design is heavy and complicated. When riding, the rider's pants tend to be contaminated with the lubricating oil of the chain transmission mechanism.

SUMMARY OF THE INVENTION

The present invention has been accomplished to provide a derailleur system for bicycle, which eliminates the aforesaid drawbacks. It is the one object of the present invention to provide a derailleur system for bicycle, which eliminates the use of a chain transmission mechanism. It is another object of the present invention to provide a derailleur system for bicycle, which enables the bicycle rider to shift the gear when the bicycle stopped.

To achieve these objects of the present invention, the derailleur system adapted for connecting a speed-changing controller of a bicycle comprises an annular plate having a center axle hole coupled to an axle of the bicycle for synchronous rotation, at least two gears mounted on the annular plate and coaxially arranged around said center axle hole, a bracket assembly rotatably mounted to said center axle hole of said annular plate, a transmission shaft pivoted to said bracket assembly, a driven gear wheel set, a control device and a driven member. The transmission shaft has a longitudinally extended receiving hole. The driven gear wheel set is mounted on said transmission shaft around said receiving hole, said driven gear wheel set including at least two driven gear wheels respectively meshed with the gears, keeping the axis of said driven gear wheel set and the axis of said gear disposed perpendicular to each other on the same plane, each driven gear wheel of said driven gear wheel set having a circular center hole for the passing of said transmission shaft and a retaining portion in said circular center hole at one side. The control device is axially movably inserted into said transmission shaft and connected to a derailleur cable of the bicycle, said control device having a bearing portion. The driven member is mounted and supported on a spring at said bearing portion of said control device for moving with said control device, said driven member having a stop portion protruded from a top sidewall thereof and adapted for engaging the retaining portion of one driven gear wheel of said driven gear wheel set.

DETAILED DESCRIPTION OF THE PREFERRED EMBODIMENT

Figure 1:
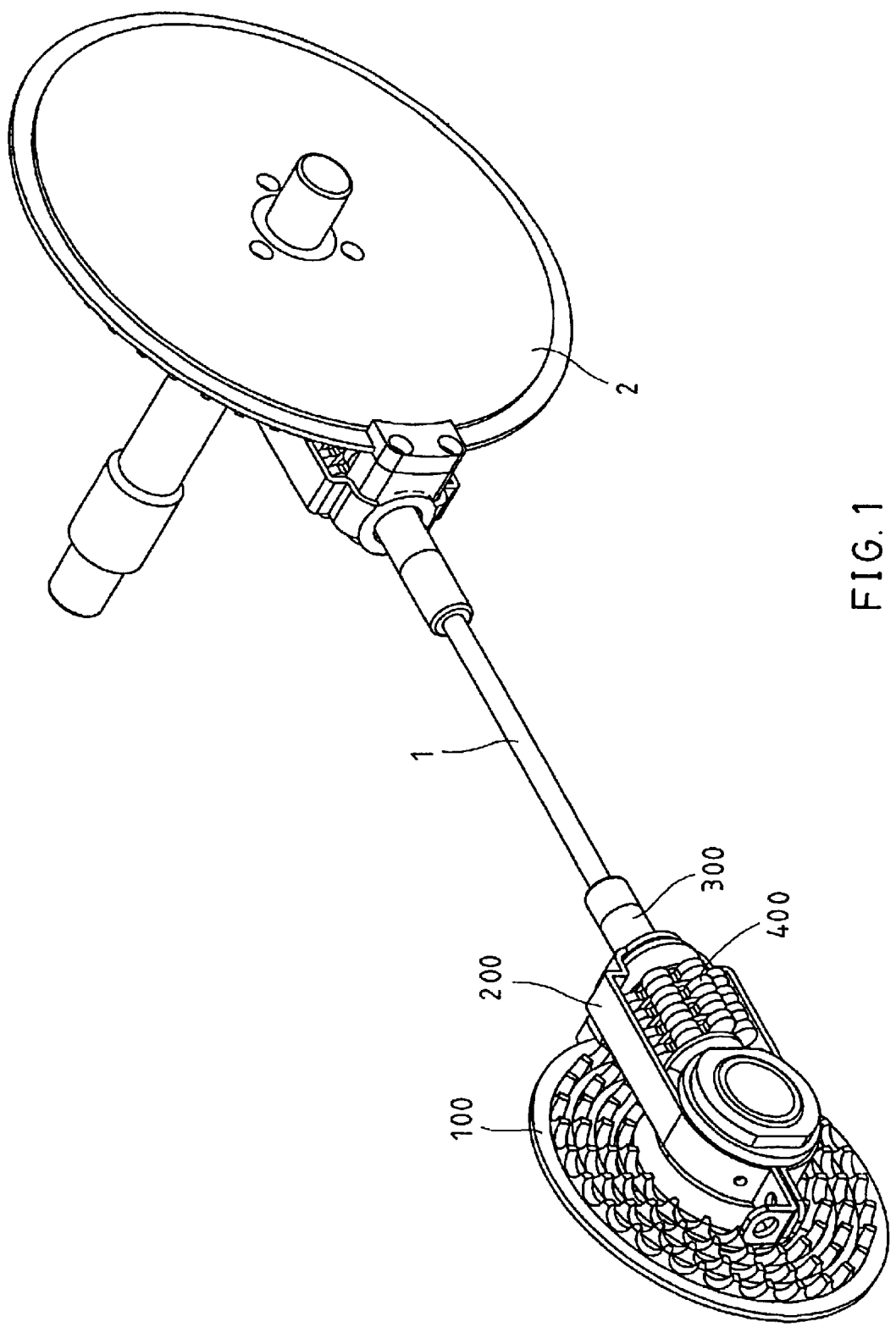
FIG. 1 is a perspective view showing two derailleur systems connected together for use in a bicycle according to the present invention.
Figure 2:
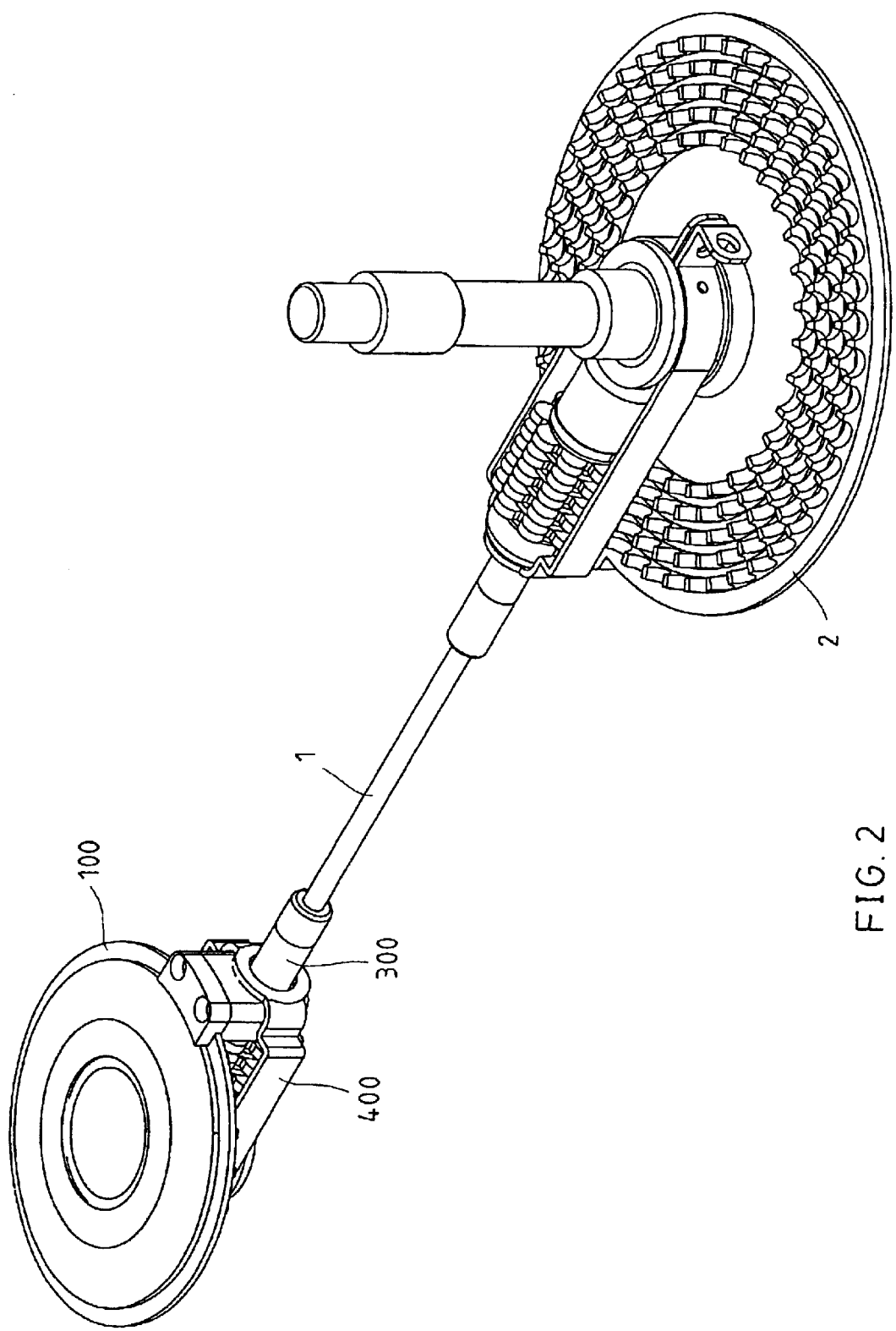
FIG. 2 is similar to FIG. 1 but viewed from another angle.

Referring to FIGS. 1 and 2, two derailleur systems are connected by a link 1 for installation in a bicycle. The two derailleur systems have same structure and act in same way. For easy understanding, the rear side derailleur system is described hereinafter.

Figure 3:
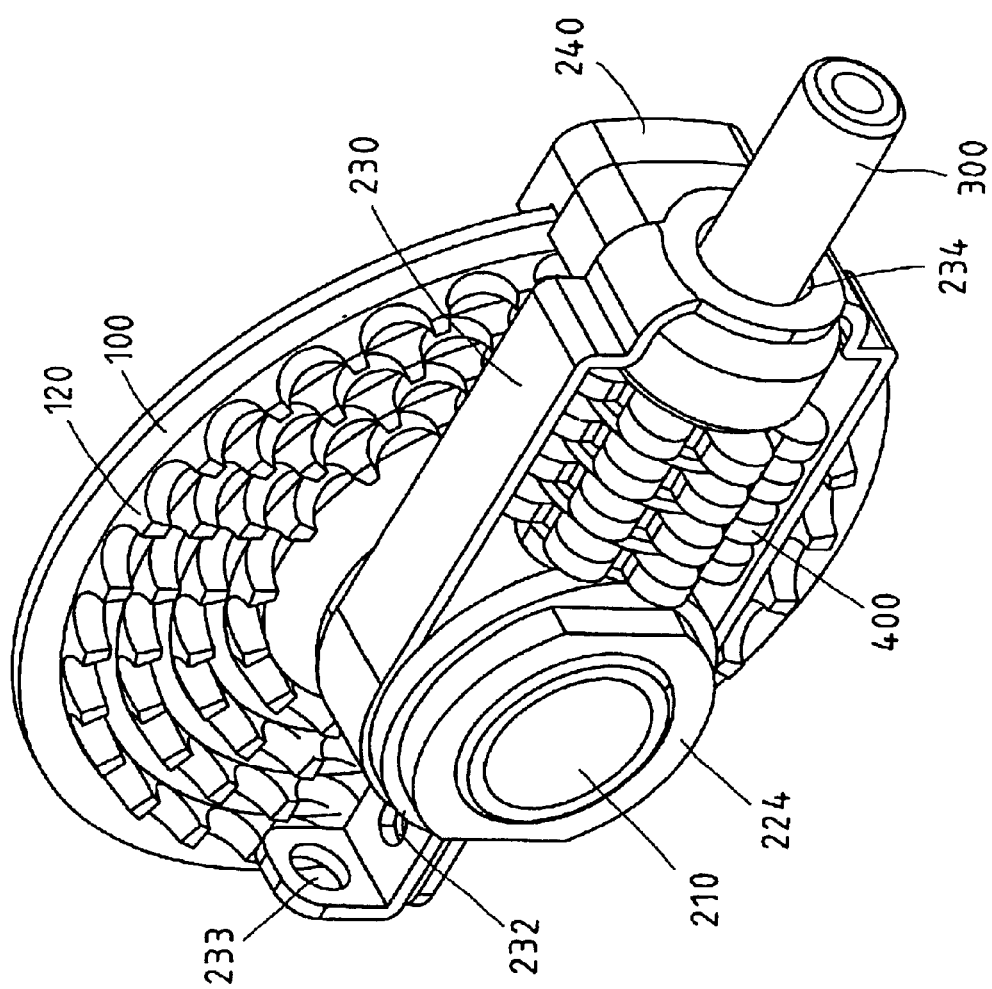
FIG. 3 is a perspective view of one derailleur system according to the present invention.
Figure 4:
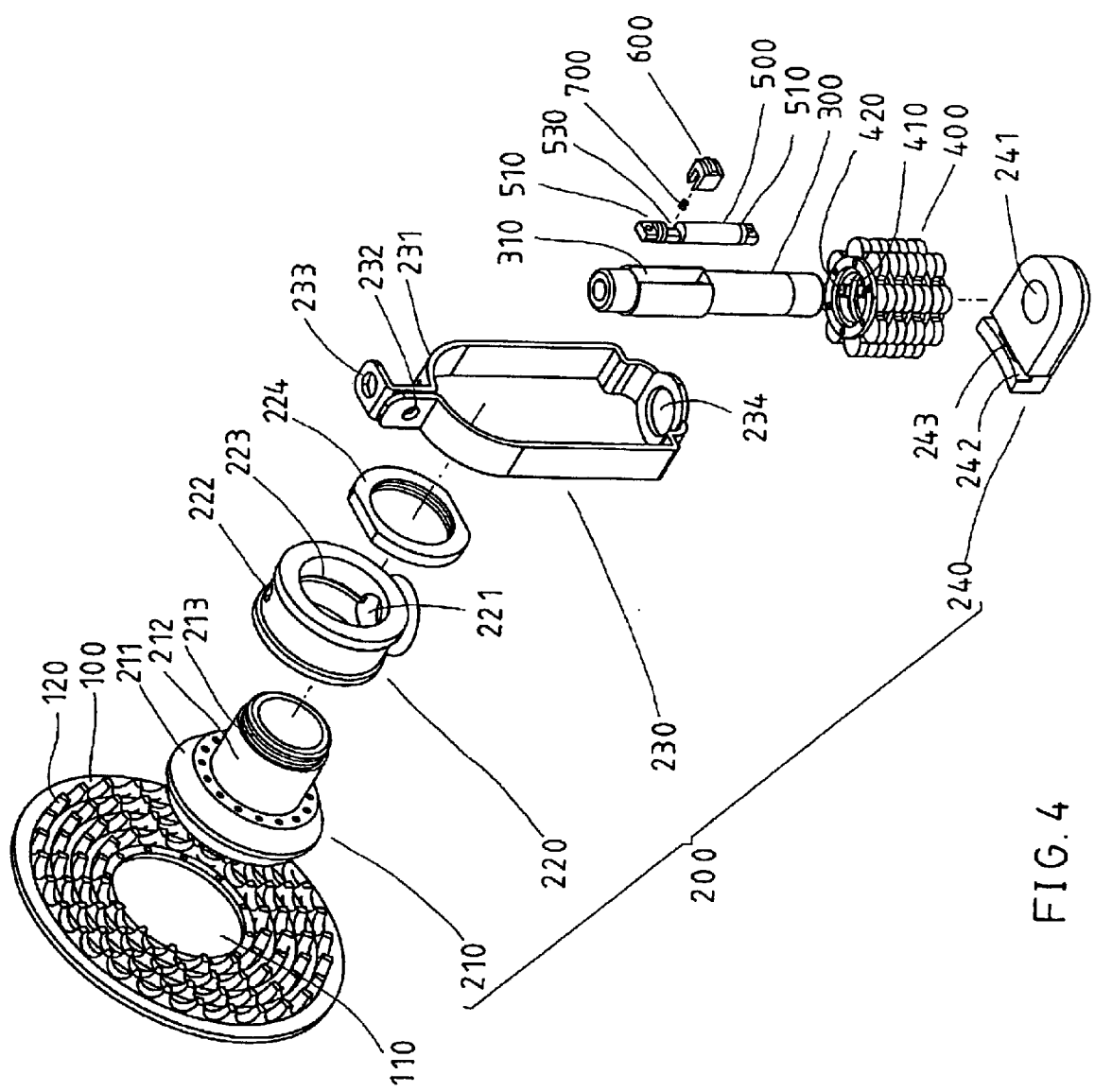
FIG. 4 is an exploded view of the derailleur system according to the present invention.
Figure 5:
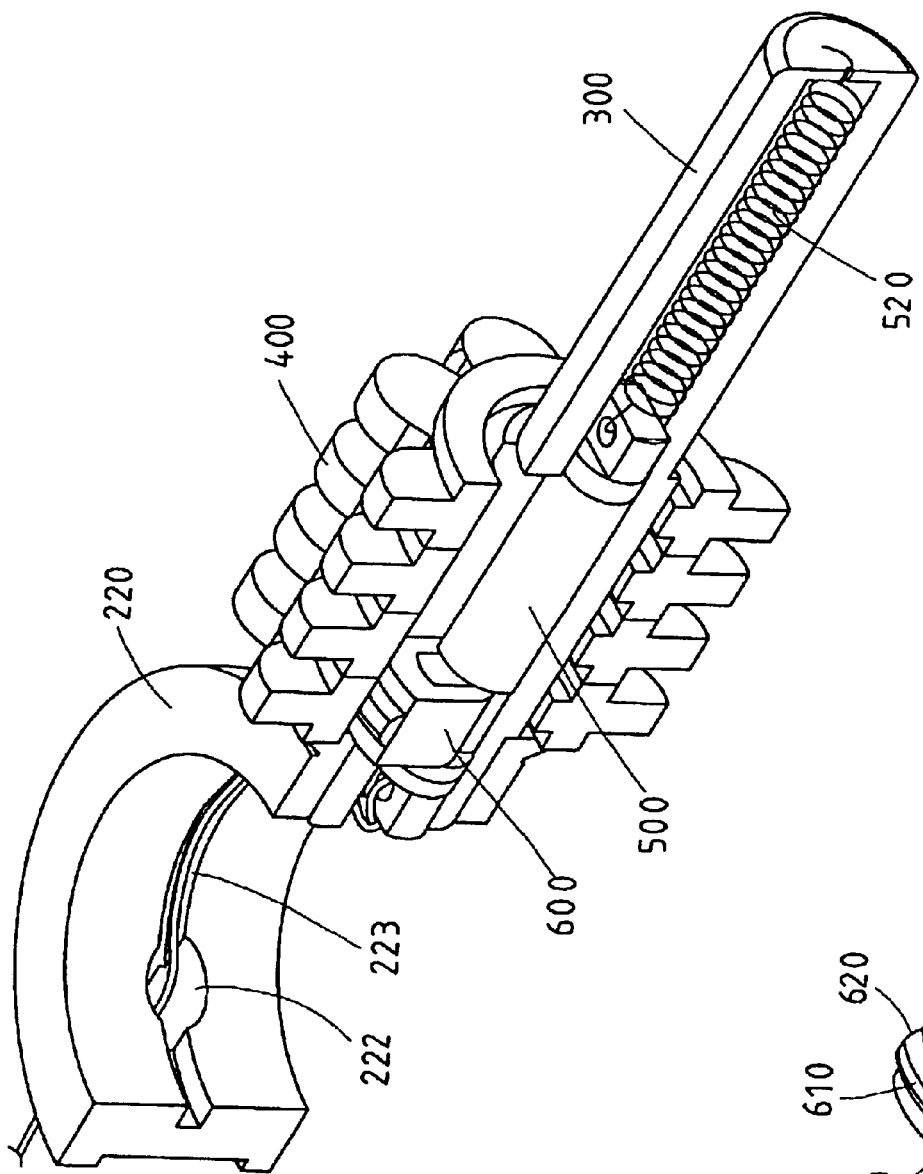
FIG. 5 is a perspective view of the driven member for the derailleur system according to the present invention.
Figure 7:
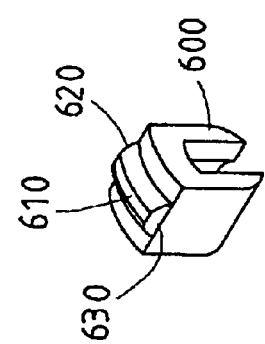
FIG. 7 is similar to FIG. 6 but showing the position of the driven member changed.

Referring to FIGS. 3~5, the derailleur system is installed in the wheel axle of the rear wheel of the bicycle (not shown), comprising an annular plate 100 holding at least two gears 120 coaxially, and a bracket assembly 200. The annular plate 100 has a center axle hole 110 coupled to the wheel axle of the rear wheel of the bicycle (not shown) for synchronous rotation with the rear wheel. The number of the gears 120 may be variously embodied. According to this embodiment, there are four gears 120 coaxially arranged around the center axle hole 110. For another derailleur system coupled to the crankshaft, the number of the gears is five as shown in FIG. 2. The number of teeth of the gear disposed more close to the axle hole is relatively smaller than that of the gear disposed away from the axle hole.

The bracket assembly 200 is rotatably mounted to the center axle hole 110 of the annular plate 100, comprising a bearing device 210, a sleeve 220, a lock nut 224, a holder device 230, and a locating device 240. The bearing device 210 comprises an axle bearing 211 connected to the wheel axle of the rear wheel of the bicycle, a stem 212 axially extended from one side of the axle bearing 211, and an outer thread 213 extended around the periphery of the stem 212 remote from the axle bearing 211. The sleeve 220 is a short barrel sleeved onto the stem 212 of the bearing device 210, having a through hole 221 and a small hole 222 radially aligned in line and a guide groove 223 extended around the inside wall thereof between the through hole 221 and the small hole 222. The lock nub 224 is threaded onto the outer thread 213 of the bearing device 210 to secure the sleeve 220 to the stem 212. The holder device 230 is shaped like a split ring, having a bearing hole 234 in the middle, two tie holes 232 respectively disposed in the free ends of two clamping arms 231 thereof, and a guide hole 233 in the free end of one clamping arm 231. The tie holes 232 are fastened together by a screw bolt to secure the free ends of the two clamping arms 231 together, for enabling the holder device 230 to be hung on the sleeve 220. The locating device 240 is perpendicularly inserted into the holder device 230, having a through hole 241 disposed in one end thereof and aimed at the bearing hole 234 of the holder device 230, a coupling groove 242 transversely disposed in one side and coupled to the periphery of the annular plate 100, and two recessed holes 243 disposed in the coupling groove 242 at two sides. The recessed holes 243 have rolling steel balls received therein and disposed in contact with the periphery of the annular plate 100.

Referring to FIGS. 3~5 again, the derailleur system further comprises a transmission shaft 300, a driven gear wheel set 400, a control member 500, and a driven member 600. The transmission shaft 300 is a hollow shaft inserted through the through hole 241 of the locating device 240 and the bearing hole 234 of the holder device 230 and pivoted to the through hole 221 of the sleeve 220, having a longitudinally extended receiving hole 310 and a hook hole 320 (see also FIG. 6).

The driven gear wheel set 400 is mounted on the transmission shaft 300 around the receiving hole 310 between the sleeve 220 and the locating device 240, including at least two driven gear wheels, for example, four driven gear wheels (the number of the driven gear wheels of the driven gear wheel set 400 is determined subject to the number of the gears 120) respectively meshed with the gears 120. When installed, the axis of the driven gear wheel set 400 and the axis of the gears 120 are disposed perpendicular to each other on the same plane. Each gear wheel of the driven gear wheel set 400 has a circular center hole 410, and a retaining portion 420 in the circular center hole 410 at one side.

The control device 500 is axially movably inserted into the transmission shaft 300, having an elongated bearing portion 530 and two swivel end pieces 510. One of the swivel end pieces 510 is connected to the derailleur cable of the bicycle, which is fixedly connected to one swivel end piece 510 of the control device 500 and then extended out of the transmission shaft 300 over the guide groove 223 of the sleeve 220 and the guide hole 233 of the holder device 230 and then connected to an external device. The other swivel end piece 510 of the control device 500 is connected to one end of a spring 520, which has the other end hooked in the hook hole 320 of the transmission shaft 300.

The driven member 600 is a substantially inverted U-shaped block member mounted in the bearing portion 530 of the control device 500 for moving with the control device 50. A spring 700 is connected between the driven member 600 and the bearing portion 530 of the control device 500. The driven member 600 has a stop portion 610 protruded from the top sidewall thereof. The stop portion 610 has two sloping side edges 630 at two opposite sides thereof, and two vertical end edges 630 at two opposite ends thereof (see FIGS. 5 and 6). The driven member 600 extends out of the receiving hole 310 of the transmission shaft 300, enabling the stop portion 610 to be forced into engagement with the retaining portions 420 of the driven gear wheels of the driven gear wheel set 400.

Figure 6:
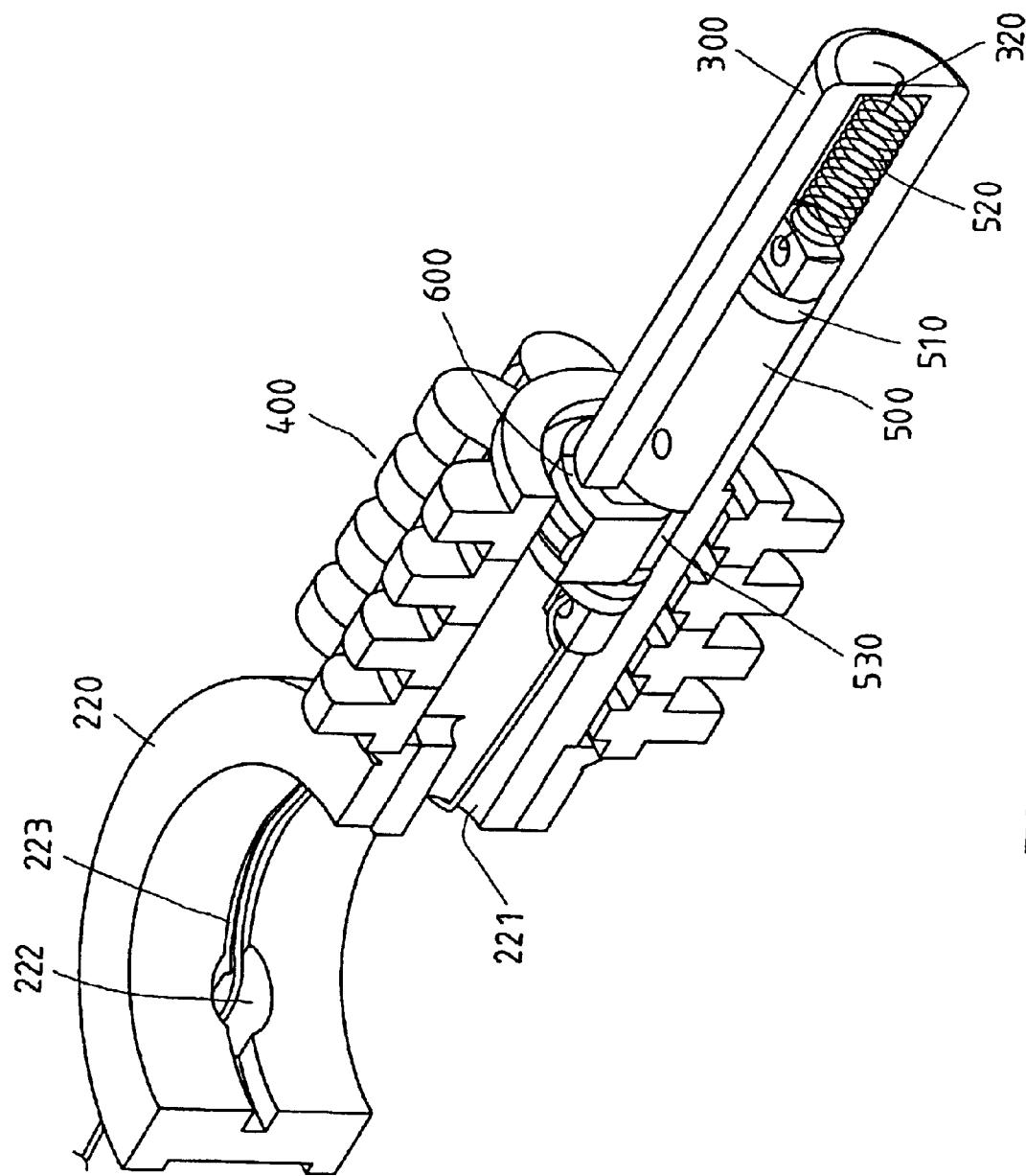
FIG. 6 is a sectional elevation of a part of the derailleur system.
Figure 9:
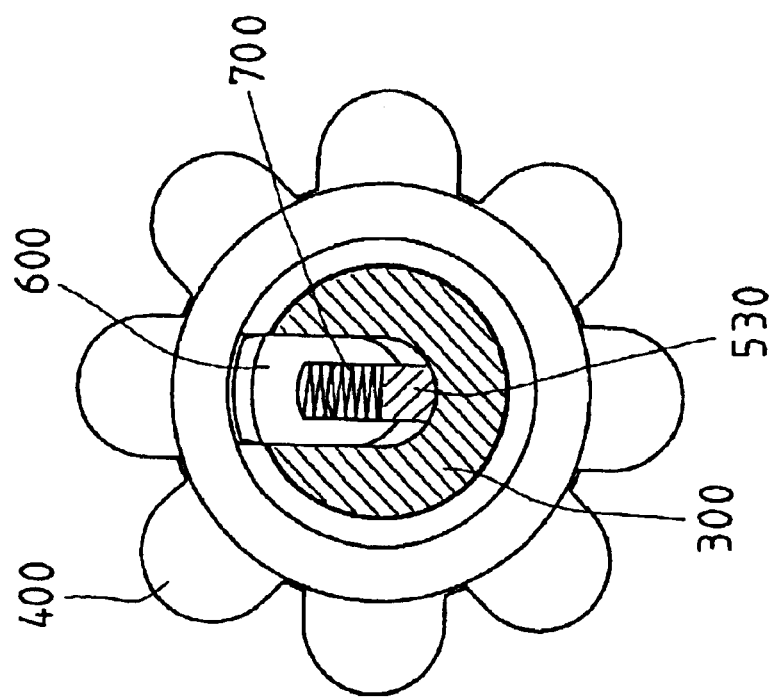
FIG. 9 is similar to FIG. 8 but showing the position of the driven member changed.
Figure 8:
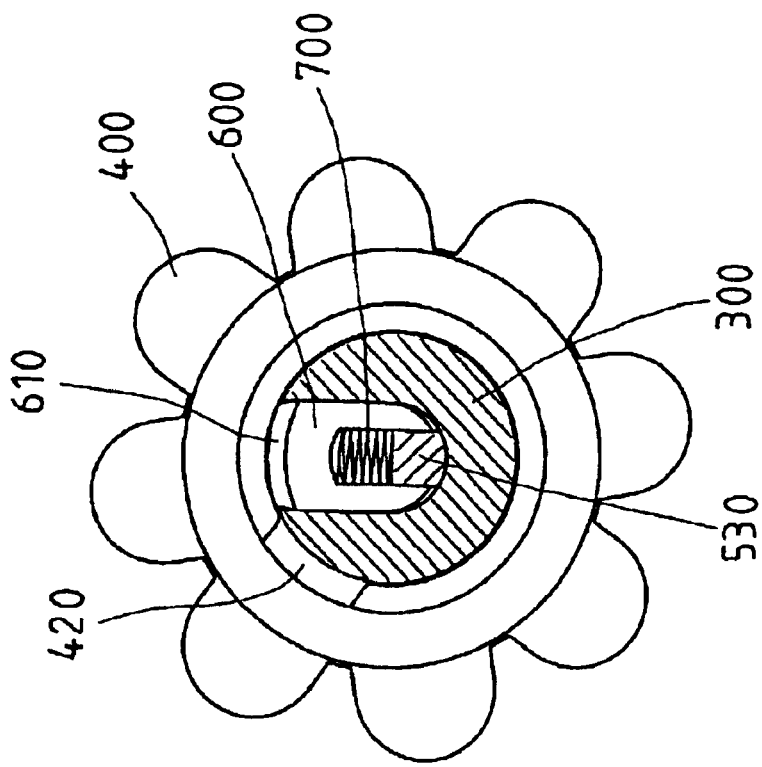
FIG. 8 is a sectional view taken along line 8—8 of FIG. 6.

Referring to FIG. 6 and FIGS. 1 and 2 again, in practice, two derailleur systems are respectively installed in the crankshaft of the bicycle and the wheel axle of the rear wheel of the bicycle. When the rider propelling the bicycle by stepping the pedals (not shown) connected to the crankshaft of the bicycle, the gears 120 of the front derailleur system are rotated with the crankshaft of the bicycle, thereby causing the driven gear wheels of the driven gear wheel set 400 to be rotated. At this time, the stop portion of the driven member is stopped at the retaining portion of one driven gear wheel of the driven gear wheel set. Therefore, the rotation of the driven gear wheels of the driven gear wheel set 400 moves the driven member and the control device, causing the driven member to move the transmission shaft. The rotary driving force of the transmission shaft is transmitted to the rear side of the bicycle through the link 1. At this time, the transmission shaft 300 of the rear derailleur system moves the driven member 600 to force one vertical end edge 630 against one driven gear wheel of the driven gear wheel set 400, thereby causing the corresponding driven gear wheel of the driven gear wheel set 400 to rotate the corresponding gear 120 and the rear wheel.

When operating the derailleur cable to shift the gear, the control device and the driven member are forced to change their position. Please refer to FIGS. from 6 through 9. Assume the driven member 600 is stopped at the first driven gear wheel of the driven gear wheel set 400 before shifting (see FIG. 6). When pulling the derailleur cable outwards, the control device is pulled outwards to stretch the spring 520. At this time, either the annular plate 100 and the driven gear wheel set 400 in rotary motion or not, the driven member 600 is pulled and moved leftwards into engagement with the second, third, or fourth driven gear wheel. The control device controls the engagement position of the driven member. When pulling the derailleur cable at one step, the driven member is moved leftwards through one step. On the contrary, when releasing the derailleur cable through one step, the pulling force of the spring pulls the driven member and the control device rightwards through one step. Therefore, the rider can shift the transmission from a big gear to a small or from a small gear to a big gear to achieve the desired gearshift transmission.

A prototype of derailleur system has been constructed with the features of FIGS. 1~9. The derailleur system functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A derailleur system adapted for connecting a speed-changing controller of a bicycle, said derailleur system comprising:

an annular plate having a center axle hole coupled to an axle of the bicycle for synchronous rotation;

at least two gears mounted on the annular plate and coaxially arranged around said center axle hole;

a bracket assembly mounted to said center axle hole of said annular plate;

a transmission shaft pivoted to said bracket assembly, said transmission shaft having a longitudinally extended receiving hole;

a driven gear wheel set mounted on said transmission shaft around said receiving hole, said driven gear wheel set including at least two driven gear wheels respectively meshed with the gears, keeping the axis of said driven gear wheel set and the axis of said gear disposed perpendicular to each other on the same plane, each driven gear wheel of said driven gear wheel set having a circular center hole for the passing of said transmission shaft and a retaining portion in said circular center hole at one side;

a control device axially movably inserted into said transmission shaft and connected to a derailleur cable of the bicycle, said control device having a bearing portion; and a driven member mounted at said bearing portion of said control device for moving with said control device, said driven member having a stop portion protruded from a top sidewall thereof and adapted for engaging the retaining portion of one driven gear wheel of said driven gear wheel set.

2. The derailleur system as claimed in claim 1, wherein said control device has a first swivel end piece disposed at one end thereof and connected to the derailleur cable of the bicycle.

3. The derailleur system as claimed in claim 2, wherein said transmission shaft has a hook hole spaced from said receiving hole at a distance; said control device has a second swivel end piece disposed at an opposite end thereof, and a spring connected between said second swivel end piece and the hook hole of said transmission shaft.

4. The derailleur system as claimed in claim 1, said stop portion of said driven member has two sloping side edges at two opposite sides thereof, and two vertical end edges at two opposite ends thereof.

5. The derailleur system as claimed in claim 1, wherein said bracket assembly comprises:

- a bearing device, said bearing device comprising an axle bearing connected to the axle of the bicycle, and a stem axially extended from one side of said axle bearing;
- a sleeve sleeved onto the stem of said bearing device, said sleeve having a through hole and a small hole aligned at two sides, and a guide groove extended around an inside wall thereof between the through hole and small hole of said sleeve; and
- a holder device shaped like a split ring and coupled between said transmission shaft and said sleeve, said holder device having a bearing hole coupled to said transmission shaft.

6. The derailleur system as claimed in claim 5, wherein said holder device has two clamping arms extended from said bearing hole at two sides, two tie holes respectively disposed in free ends of said clamping arms thereof and fastened together by a screw bolt, and a guide hole in the free end of one of said clamping arms for guiding the derailleur cable of the bicycle.

7. The derailleur system as claimed in claim 5, wherein said bracket assembly further comprises a locating device perpendicularly inserted into said holder device, said locating device having a through hole disposed in one end thereof and aimed at the bearing hole of said holder device for the passing of said transmission shaft, a coupling groove transversely disposed in one side thereof and coupled to the periphery of said annular plate.

8. The derailleur system as claimed in claim 7, wherein the driven gear wheels of said driven gear wheel set are arranged between said sleeve and said locating device.

9. The derailleur system as claimed in claim 7, wherein said locating device further comprises two recessed holes disposed in said coupling groove at two sides, said recessed holes having rolling steel balls received therein and disposed in contact with the periphery of said annular plate.

\* \* \* \* \*